(12) United States Patent
Lee

(10) Patent No.: US 8,553,235 B1
(45) Date of Patent: Oct. 8, 2013

(54) HIGH RESOLUTION AND HIGH SENSITIVITY OPTICALLY ACTIVATED TOUCH SENSING DEVICE USING MULTIPLE COLOR LIGHT SOURCES

(71) Applicant: Wen-Chieh Geoffrey Lee, Taipei (TW)

(72) Inventor: Wen-Chieh Geoffrey Lee, Taipei (TW)

( * ) Notice: Subject to any disclaimer, the term of this patent is extended or adjusted under 35 U.S.C. 154(b) by 0 days.

(21) Appl. No.: 13/743,582

(22) Filed: Jan. 17, 2013

Related U.S. Application Data

(60) Provisional application No. 61/587,847, filed on Jan. 18, 2012.

(51) Int. Cl.
  *G01B 11/14* (2006.01)
  *G06F 3/042* (2006.01)

(52) U.S. Cl.
  USPC ........... 356/614; 356/622; 356/623; 345/175; 345/176

(58) Field of Classification Search
  USPC ................. 356/614, 620, 622, 623; 345/175, 345/176, 166; 250/559.29
  See application file for complete search history.

(56) References Cited

U.S. PATENT DOCUMENTS

| | | | |
|---|---|---|---|
| 5,825,945 A | 10/1998 | Stolis et al. | |
| 6,218,659 B1 * | 4/2001 | Bidiville et al. | 250/221 |
| 6,392,632 B1 | 5/2002 | Lee | |
| 7,301,531 B2 | 11/2007 | Wu | |
| 7,313,255 B2 * | 12/2007 | Machida et al. | 382/107 |
| 7,355,160 B2 | 4/2008 | Cheah et al. | |
| 7,439,954 B2 * | 10/2008 | Theytaz et al. | 345/166 |
| 7,872,639 B2 | 1/2011 | Theytaz et al. | |
| 2004/0046741 A1 * | 3/2004 | Low et al. | 345/166 |
| 2005/0024336 A1 | 2/2005 | Xie et al. | |
| 2005/0024623 A1 | 2/2005 | Xie et al. | |
| 2005/0231482 A1 * | 10/2005 | Theytaz et al. | 345/166 |
| 2009/0046903 A1 * | 2/2009 | Corcoran et al. | 382/124 |
| 2009/0160772 A1 | 6/2009 | DePue et al. | |
| 2011/0085708 A1 * | 4/2011 | Martin et al. | 382/115 |
| 2013/0002555 A1 | 1/2013 | Lee | |

OTHER PUBLICATIONS

"The relationship among the primary colors of light resembles the phase nature of wave," Geoffrey Lee, Sep. 7, 2011, Data Source: Optics, 4th ed., Eugene Hecht, Addison Wesley, p.p. 133, 2002.
"About BlueTrack Technology," Bluetrack Technology in a Computer Mouse, Microsoft Hardware, pp. 1-3, found: http://www.microsoft.com/hardware/en-us/bluetrack-technology, on Sep. 14, 2011.
"Metamerism (color)," From Wikipedia, the free encyclopedia, pp. 1-4, Jul. 14, 2011, found: http://en.wikipedia.org/wiki/Metamerism_color.

* cited by examiner

*Primary Examiner* — Roy M Punnoose
(74) *Attorney, Agent, or Firm* — Saile Ackerman LLC; Stephen B. Ackerman

(57) ABSTRACT

A cursor maneuvering device comprises a cavity containing a plurality of colored lights and an image sensor and covered with a light mixing plate. The colored lights are located in the cavity in an as largely departed as possible manner and illuminate a pointing device contacting the surface of the light mixing plate. The image sensor detects a hue of light illuminating the pointing device and controls a cursor depending upon the hue. Changes in the hue of a moving pointing device are translated into movement of the cursor on the display of an electronic device. The pointing device may be anything touching the light mixing plate, for instance a finger.

14 Claims, 6 Drawing Sheets

HIGH RESOLUTION AND HIGH SENSITIVITY OPTICALLY ACTIVATED TOUCH SENSING DEVICE USING MULTIPLE COLOR LIGHT SOURCES

This application claims priority to Provisional Patent Application Ser. No. 61/587,847, filed on Jan. 18, 2012, which is herein incorporated by reference in its entirety.

This patent application is related to Provisional Patent Application Ser. No. 61/571,514, filed on Jun. 29, 2011, and to patent application Ser. No. 13/482,086, filed on Feb. 29, 2012, both of which are herein incorporated by reference in their entirety.

TECHNICAL FIELD

The present disclosure relates to cursor maneuvering devices and in particular to an optically activated cursor maneuvering device, which tracks the color of a pointing device.

BACKGROUND

Today various kinds of portable electronic devices, e.g. notebook computers, cellular phones etc., rely on a touch pad (mouse pad) or a touch screen to sense the movement of a pointing device (often a finger) and to translate that movement into a cursor movement on a screen display of the electronic device. The two most popular pointing device sensing technologies are resistive and capacitive sensing technologies. On portable electronic devices these two technologies provide a convenient way to control a cursor as opposed to a USB cable connected computer mouse. The disadvantage for pointing device technology on portable electronic devices (e.g. iPhone, iPad, etc.) is a lack of cursor positioning accuracy by a pointing device, for example a finger or a stylus.

Although portability is an advantage for electronic devices comprising a notebook computer, the notebook computer is difficult to use in an office environment where cursor positioning accuracy is important. This problem is aggravated when the dimension of the notebook computer is reduced over years of development. This difficulty of usage leads to many users replacing the touch pad of the notebook computer with a computer mouse attached by a USB cable or more recently by a mouse connected by electronic signal means. In either case the coupled mouse requires extra hardware that must be ported along with the notebook computer.

US 2009/0160772 A1 (DePue et al.) is directed to an optical mouse with diffused optics, wherein an optical diffuser is configured to diffuse light from the light source that illuminates the tracking surface. U.S. Pat. No. 7,439,954 B2 (Theytaz et al.) is directed to a multi-light source computer pointing device wherein each light source has at least one unique illumination characteristic comprising impinging angle, light wavelength and light homogeneity. In U.S. Pat. No. 7,355,160 B2 (Cheah et al.) a pointing device and a method is directed to generating colored light in a plurality of wavelength bands, wherein a controller selects the wavelength band to illuminate the surface under the pointing device. U.S. Pat. No. 7,301,531 B2 (Wu) is directed to an optical mouse having a plurality of light sources of different color to eliminate the complementary color problem between the image light and the reflecting surface. U.S. Pat. No. 6,392,632 (Lee) is directed toward an optical cursor control device comprising an integrated camera, wherein captured images by an imaging device detects motion of the cursor control device. U.S. Patent Application No. 2005/0024336 (Xie et al.) is directed to the use of a Lambertian surface in a computer mouse to form a specular reflection, which provides an enhanced contrast to the image for purposes of navigation. U.S. Patent Application No. 2005/0024623 (Xie et al.) is directed to the use of a Lambertian surface and a narrow bandwidth of light in a computer mouse to form a narrow bandwidth specular reflection. U.S. Pat. No. 5,825,945 (Stolis et al.) is directed to a check imaging device using a Lambertian surface to project a highly uniform and diffused beam to an imaging site.

SUMMARY

It is an objective of the present disclosure to illuminate a pointing device, for instance a finger, with a plurality of colored lights.

It is also an objective of the present disclosure to evaluate the hue of the illuminated pointing device resulting from the plurality of colored lights to determine location and movement of the pointing device in contact with the Lambertian plate of the cursor maneuvering device.

In the present disclosure an optical cursor maneuvering device is formed on a portable electronic device for the purpose of controlling the cursor on a display of the electronic device. It should be noted that although the present disclosure cites portable electronic devices and a means to control a cursor, more stationary electronic devices, such as desktop computers, can use the cursor maneuvering device of the present disclosure.

The optical cursor maneuvering device of the present disclosure is formed from a cavity that is covered with a light mixing plate (e.g. a Larnbertian plate, a light diffusing plate, or a florescent plate, etc.). The cavity contains a plurality of colored light sources, which are made of, for example, LED (light emitting diode), where each light source emits light in a color (i.e. wavelength) different than that of the other. The cavity also contains an image sensor, and the cavity can be formed from several different shapes, e.g. square, rectangular, circular, oval, etc. The plurality of lights are positioned in a manner on the base of the cavity as separated as possible, and the image sensor is positioned on the base of the cavity amongst the plurality of colored lights in such a way as to allow the image sensor to detect the image of the pointing device in contact with the surface of the light mixing plate.

The light mixing (e.g. a Lambertian plate, a diffusing plate, or a florescent plate, etc.) plate is a semi-transparent plate that has a surface, which is a nearly perfect diffusing surface. The light mixing plate is semi-transparent, which allows light from either side of the plate to pass through in a highly diffused state, but the observer is not able to discern the exact shape of any object that lies at a distance from the opposite side of the plate. The light mixing plate that covers the cavity disperses the ambient light falling on its surface, which is external to the cursor maneuvering device, and the light mixing plate does the same work for the light beam coming from within the cavity when it passes through the light mixing plate. As of such, a blurred image without clearly defined contour will be formed on the image sensor. Mathematically, the light mixing effect can be modeled by radiative transfer equations (RTE). For example a rough surface would scatter light in more directions (i.e. more isotropic) than a smooth surface does. Thus the clarity of the image caused by the light beam being reflected by the two different kinds of surfaces differs by different scattering effects.

The image blurring phenomenon is enhanced when an object is moved to a distance farther away from the light mixing plate, and the image blurring is reduced as the object is moved closer to the light mixing plate. There are other methods and types of plates that may serve the same purpose of passing a mixed light to the image sensor. For example, a transparent plate with a pointing device being able to mix the incoming light and reflect it back to the image sensor will allow the image sensor to track the pointing device based on the color reflected back to the image sensor. In the conventional art, an object with the blurred edge poses a challenge for pattern recognition, and makes the task of motion detection is thwarted. However, in the present disclosure, the task of motion detection is not thwarted since it is the color of the object, or pointing device, rather than the edge, or contour, of the object that determines the location. The light intensity value of the object, or pointing device, being tracked has the highest value when the object, or pointing device, is touching the mixing plate, the blurred image of the object, or pointing device, has a higher light intensity than that of the surrounding area of the mixing plate. This bright but blurred spot serves as an ideal target for the image sensor to trace when the object, or pointing device, is moving on the light mixing plate. The plurality of light sources within the cavity is preferably LED devices; however, other light sources can be used. The image sensor is preferably a color-sensitive CMOS imaging device capable of viewing the inside surface of the light mixing plate covering the cavity; however, other color imaging devices capable of viewing the color of the image of the object, or pointing device, rendered from the light mixing plate can be used to determine the location of the object, or pointing device.

When a pointing device, e.g. a finger, stylus or similar device, contacts the surface of the light mixing plate, a portion of light emitted from the plurality of light sources within the cavity of the cursor-maneuvering device produces an brightened image of the of the pointing device (i.e. by reflecting light back to the cavity). The image sensor then detects the color hue of this brightened image and monitors the changes of the hue as the pointing device is moved over the surface of the light mixing plate from which the electronic circuitries associated with the image sensor analyzes the color hue and provides control to a cursor on the screen of an portable electronic device, e.g. notebook PC, cellular phone, global positioning system, gaming device, etc. Further, the pointing device can be lifted and reapplied to the light mixing plate's surface to indicate selection of an element on the display of the electronic device. Still further and especially in the case of the notebook PC, multiple fingers can be uses in various predetermined locations on the light mixing plate's surface to perform functions in addition to cursor movement, e.g. scrolling, rotating an image, zooming in on the display screen to provide high resolution and sensitivity for accurate positioning of the cursor.

A cursor as used herein is a place on the display, or a data in the memory of an electronic system, wherein the data of said memory can be updated in a timely manner by the cursor controlling device during system operation. For example, when a cursor maneuvering device sends updated data to an electronic system, the memory unit therein changes its content accordingly. This updated content is then translated to a location, or a functionality of the electronic system, etc.

BRIEF DESCRIPTION OF THE DRAWINGS

This disclosure will be described with reference to the accompanying drawings, wherein.

DETAILED DESCRIPTION

Figure 1A:
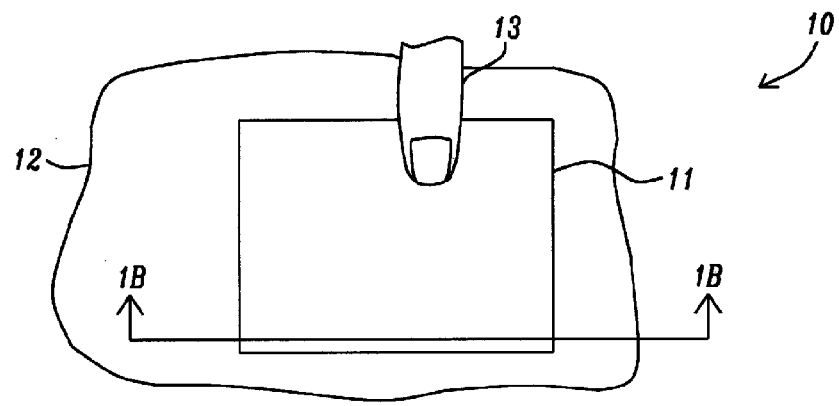
FIGS. 1A, 1B and 1C are diagrams of an optical cursor maneuvering device using one light source as detailed in the related Provisional Patent Application 61/571,514.

In FIG. 1A is a top view of an optical cursor maneuvering device of the related Provisional Patent Application 61/571,514. A cursor maneuvering device 10 is formed with a light mixing plate 11 covering a cavity in a surface of a portable electronic device 12. A pointing device, in particular a finger 13, is shown in contact with the surface of the light mixing plate. The light mixing plate is a semi-transparent plate that has a surface, which is a nearly perfect diffusing surface.

Figure 1B:
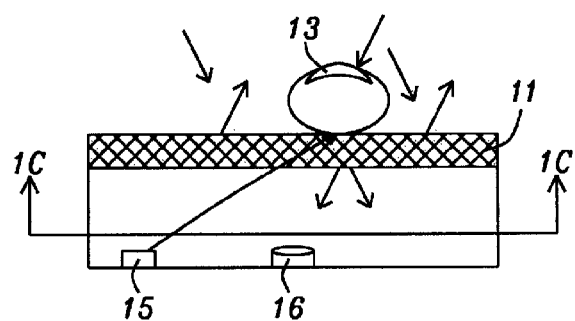
Figure 1C:
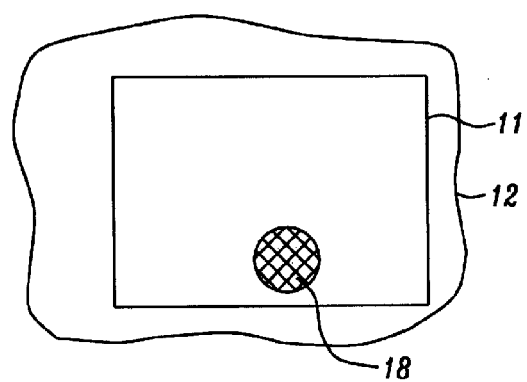

In FIG. 1B is shown a cross section view of the optical cursor maneuvering device that is detailed in the referenced Provisional Patent Application 61/571,514. Contained within the cavity are a light source 15 and an image sensor 16. When the pointing device, finger 13, is in contact with the light mixing (e.g. a Lambertian plate, or a florescent plate, etc.) plate 11, the area of contact is brightened by the light source 15 such that the image of the area 18 of the finger in contact with the surface of the light mixing plate 11 is visible to the image sensor 16, FIG. 1C.

Figure 2A:
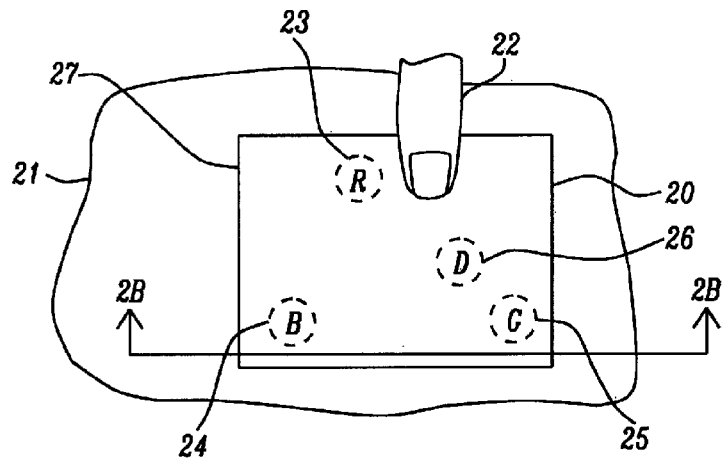
FIGS. 2A, 2B and 2C are diagrams of an optical cursor maneuvering device using a plurality of colored light sources of the present disclosure.
Figure 2B:
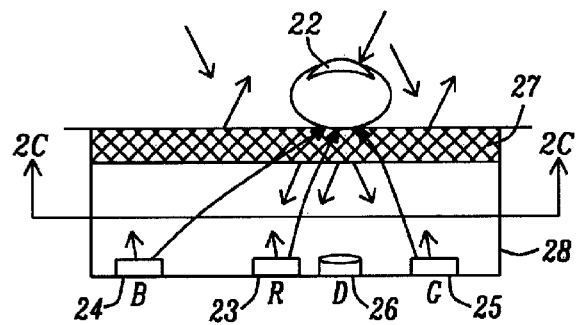
Figure 2C:
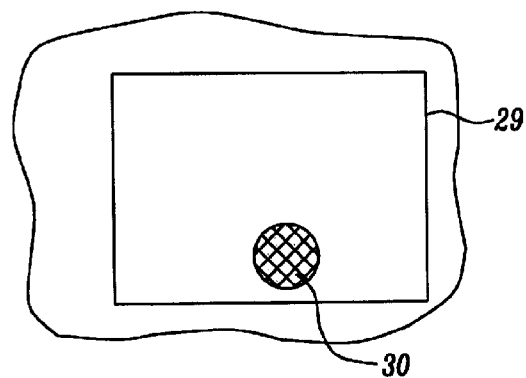

In FIGS. 2A, 2B and 2C is shown a first embodiment of the present disclosure. FIG. 2A is a plan view of an optical cursor maneuvering device 20 embedded, or formed, within the structure 21 of a portable computing device. A pointing device, a finger 22, is shown in contact with a light mixing plate 27 that covers a cavity 28 (FIG. 2B). Located on the bottom of the cavity 28 are three colored lights comprising red (R) 23, blue (B) 24 and green (G) 25 as well as an image sensor (D) 26. The three colored lights 23, 24 and 25 are located in an as far departed as possible manner from each other and are preferably LED devices. The image sensor is positioned to have a clear view of the entire underside of the light mixing plate 29 and view of the area of contact 30 (FIG. 2C) of the finger, or pointing device.

Light from each of the three colored lights is directed to the underside of the light mixing plate 29 where some of that light is dispersed back into the cavity in a diffused manner. The rest of the light from the three colored lights is transmitted to the upper surface of the light mixing plate where some of the light is dispersed back towards the cavity and some of the light is dispersed beyond upper surface of the light mixing plate 27 in a diffused fashion. When a pointing device, such as a finger 22, touches the outer surface of the light mixing plate (FIG. 2B), light from the three light sources red 23, blue 24 and green 25 impinge on surface 30 of the pointing device in contact with the outer surface of the light mixing plate. The color of the contact area 30 is a combination of the amount of light from each colored light 23, 24 and 25 that reaches the contact area 30 and produces a hue that is a combination of colored light impinging on the contact area from the three light sources. The closer the contact surface 30 of the pointing device 22 is to a first colored light, the more the resulting hue is dominated by the first colored light. Conversely the farther away the contact surface of the pointing device is from the first colored light, the less the resulting hue is dominated by the first colored light.

Thus by monitoring the hue (or any characteristic of light associated with color) of the reflected colored light from the contact area 30 of the pointing device, the image sensor can determine an accurate position of the pointing device and therefore, the cursor of the electronic device by monitoring the details of the pointing device contact area 30. Further, because of the diffusing nature of the light mixing plate 27, the details may not be that clear to the image sensor, which otherwise could lead to inaccuracies in positioning the cursor of the portable electronic device.

TABLE 1 is an example of a lookup table for the RGB format and the translation of a particular set of colors of the contact area 30 as seen by the image sensor translated into the location of the pointing device on the light mixing plate. A unique color code can also be created for other color formats, for example YUV, LAB, CIE, etc (these are color index values). Thus by detecting the color of light reflected from a pointing device the image sensor and associated electronic circuits can determine the position and movement of the pointing device and translate the location and movement of the pointing device into location and movement of the cursor on a display associated with the electronic device to which the cursor maneuvering device is connected.

TABLE 1

| Color index value of image sensor | | | Corresponding geographical position on light mixing plate | |
|---|---|---|---|---|
| R1 | G1 | B1 | X1 | Y1 |
| R2 | G2 | B2 | X2 | Y2 |
| R3 | G3 | B3 | X3 | Y3 |

Figure 3A:
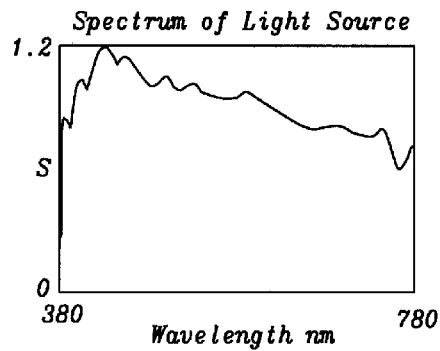
FIGS. 3A, 3B, 3C and 3D are graphs demonstrating a process of metamerism of the present disclosure.
Figure 3B:
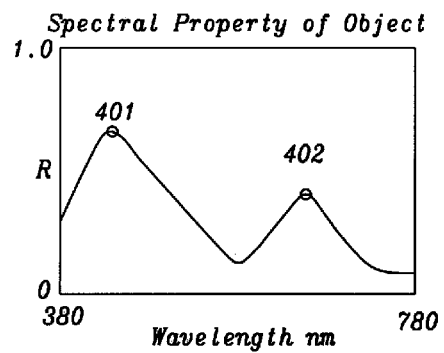
Figure 3C:
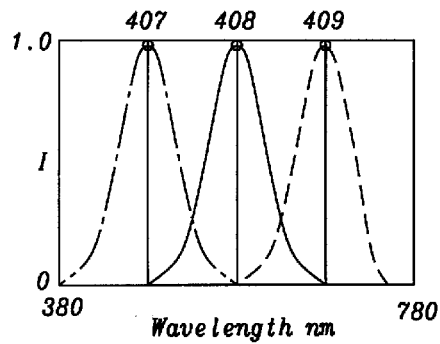
Figure 3D:
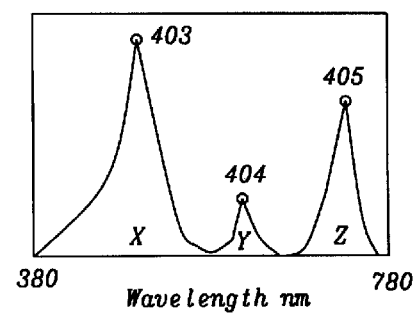

FIGS. 3A, 3B, 3C and 3D graphically shows how an object like a pointing device illuminated by a plurality of light sources creates a reflected light that is interpreted by an image sensor. FIG. 3A shows a light source with a spectrum S over a broad wavelength of light (380 nm to 780 nm) directed toward an object (pointing device). FIG. 3B shows the spectral properties (reflectance R) of the object (pointing device) over the 380 nm to 780 nm bandwidth of the light source. There are two reflectance peaks 401 and 402 in FIG. 3B where more light is reflected for a particular wave length than surrounding wavelengths. If FIG. 3A and FIG. 3B are combined (i.e. mathematically, multiplying S and R values throughout the wavelength span), and the resultant data (which represents the energy density of the light reflected from object) is further multiplied by the sensitivity of an image sensor (whose peaks are denoted by the discrete peaks of 407, 408 and 409, as shown in FIG. 3C), then the graph of FIG. 3D shows the resultant spectrum of the light observed by the image sensor, wherein the peaks 403, 404, and 405 represent the observed light reflected from the object characterized in FIG. 3B, which is illuminated by the light source described in FIG. 3A.

Figure 5A:
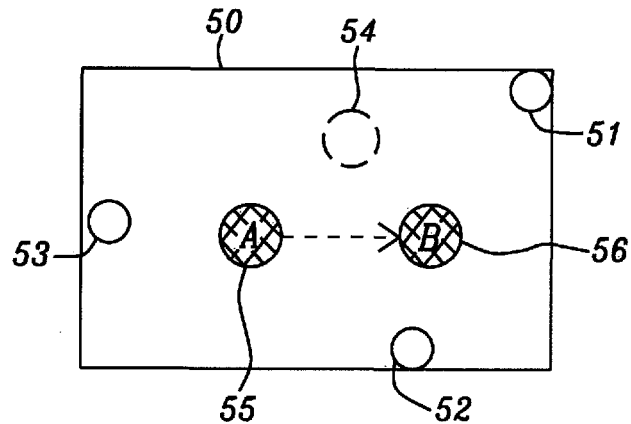
FIG. 5A is a diagram of a cursor maneuvering device of the present disclosure including a pointing device movement.
Figure 5B:
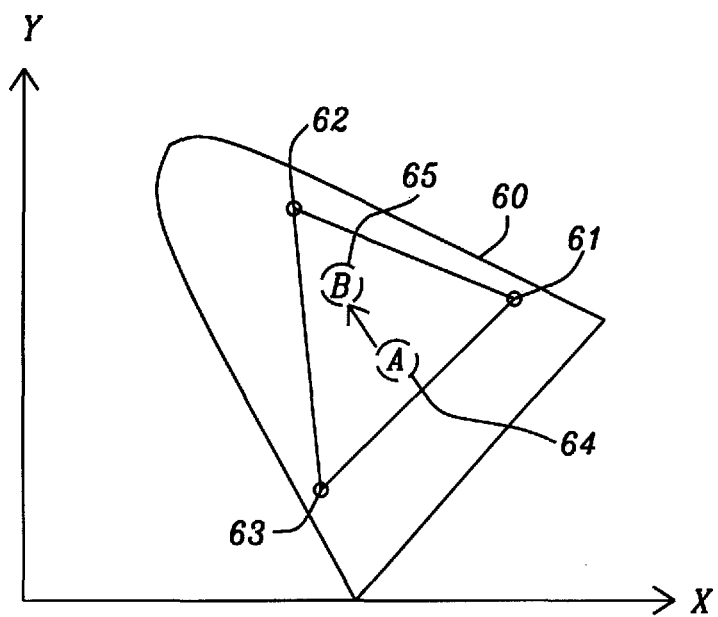
FIG. 5B is a diagram of a color gamut of the present disclosure locating the pointing device movement within the color region of the cursor maneuvering device.

FIG. 5A shows an exemplary case 50 where a targeted object is moved from one position 55 to another 56 (i.e. A to B). In this case there are three light sources 51, 52, and 53 and an image detector 54. The corresponding color gamut for the three light sources is a triangle within a larger color gamut 60 (FIG. 5B) When the targeted object moves, the resultant color index in color gamut changes from A 64 to B 65 caused by the different colored light reflected by the target object at the respective points 55 and 56. As can be seen in FIG. 5B a triangular shaped area formed within the color gamut 60 by interconnecting the location of the colors 61, 62 and 63 of the colored lights 51, 52 and 53 defines the boundaries of the light reflected by the targeted object or pointing device. By decoding the color index value into the geographical position, the device of the present disclosure is able to recognize the movement and the location of targeted object 55 and 56 rapidly. The method described herein is more accurate and faster than that of the conventional art (i.e. desktop optical mouse) in that it does NOT depend on pattern recognition to ascertain the existence of the objects where pattern recognition has to compare pixels values of two image frames. This technique is also superior to another school of conventional art, the touch pad adopted by many notebook computers today. The change of color will takes place at very high speed (literally at the speed of light), and it is not affected by the electrostatic characteristics of the touch pad device, such as resistance or capacitance.

The Present disclosure has additional ways to enhance its sensitivity and resolution in detecting the location of a pointing device. It should be noted that TABLE 1 depicts only a generic mean of the present disclosure (i.e. using red, blue, and green light sources for motion detection). In practical cases, the device designers may designate the wavelengths of the light sources to be different than red, blue, or green. Also the sensitivity of the image sensor may also be adjusted, which means that the sensitivity of the respective photodiodes is not necessarily only red, blue, or green. Typical means for adjusting the sensitivity of said image sensor comprise using different color filter materials, or adjusting the doping level of the CMOS image sensor, etc. In an extreme case in which the task of pattern recognition is not totally eliminated, pattern recognition still can be used as a facilitative means of the present disclosure in an efficient means, wherein the image sensor can be simplified to only a few photodiodes rather than a large array.

The following depicts a method provided by the present disclosure to further enhance sensitivity and resolution to a level that is superior to the prior art. It has to do with color metamerism physics. This method teaches a way to select the light sources, and image sensor that yield the best result for resolution and sensitivity. Referring back to FIG. 3C, note that during operation, photon flux will impinge on the light sensitive elements of an image sensor (or other electronic sensors with similar function), and each light sensitive element has a designated sensitivity to the color light as is depicted by FIG. 3C. Specifically, in a CMOS image sensor, the sensitivity of each light sensitive element to color light is defined by a color filter array (CFA). It should be noted that there are other means to designate the color sensitivity of a light sensitive or photodiode, whose result falls within the scope of this disclosure. In the present disclosure, the sensitivity of the respective light sensitive elements, or photodiodes, is preferred to be aligned with the spectra of the multi color light sources. The following illustrate how the alignment is done.

Equations EQ. 1 through EQ. 4 can be used to calculate the spectrum of light detected by the image sensor in FIG. 3D.

$$X = k_\lambda \sum S_\lambda R_\lambda \bar{x} \Delta \lambda \qquad \text{EQ. 1}$$

$$Y = k_\lambda \sum S_\lambda R_\lambda \bar{y} \Delta \lambda \qquad \text{EQ. 2}$$

$$Z = k_\lambda \sum S_\lambda R_\lambda \bar{z} \Delta \lambda \qquad \text{EQ. 3}$$

$$k = \frac{100}{\sum_\lambda S_\lambda \bar{y}_\lambda \Delta \lambda} \qquad \text{EQ 4}$$

Where X, Y, and Z represent the respective peaks in the resultant spectrum of the light flux seen by the image sensor;
$S_\lambda$ is the light emitted by the light sources (i.e. FIG. 3A);
$R_\lambda$ is the reflectance of light by the object being viewed by the image sensor (i.e. FIG. 3B);
$\lambda$ is the wavelength of light; and
$\bar{x}$, $\bar{y}$, $\bar{z}$ are the sensitivities of the image sensor at the wavelength of light, $\lambda$ (i.e. FIG. 3C).

Figure 4:
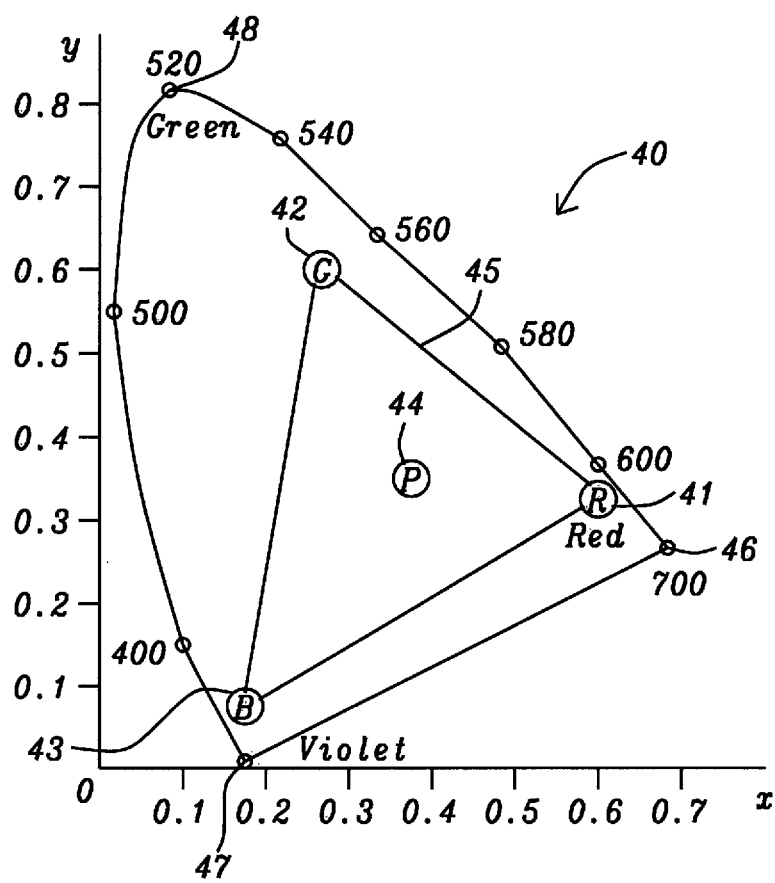
FIG. 4 is a graph of a color gamut of the present disclosure demonstrating location of the light sources and hue of reflected light from pointing device.

FIG. 4 shows a color gamut 40 formed by the light reflected from the pointing device back to the image sensor to demonstrate the effect of the present disclosure. (It should be noted that by convention the lower case letters x and y shown in FIG. 4 denote chromaticity coordinates, whereas the capitalized letters X, Y and Z, shown in FIG. 3, denote the tri-stimulus values.) The colored light sources are designated to be R (41), G (42) and B (43) (in which R means red, G means green, and B means blue) and are placed on the gamut to demonstrate the area of light color that could be bounded by the three light sources. The pointing device P (44) is positioned within the triangle formed by the location of the three light sources to demonstrate a possible reflected composite color seen by the image sensor. As the pointing device P (44) is moved closer to one of the colored lights, the reflect light will be more dominated by that particular light source and less dominated by the other two light sources. The image sensor and the coupled circuitry dissects the color reflected by the pointing device into several kinds of pixels (e.g. Red, Blue, and Green) to determine a position of the pointing device on the light mixing plate as demonstrated in TABLE 1. The location and movement of the pointing device is tracked by the color of the pointing device seen by the image sensor, which is translated into coordinate for a cursor on a display screen of an electronic computing device. The detection of reflected color from the pointing device provides a more accurate means for determining the position of cursor on a display screen (than conventional touch pads) since the shape and detail of the pointing device is not required to be observed by the image sensor through the diffusing nature of the light mixing plate.

It should be noted that primary colors (i.e. R, G, B) are used for the color light sources and the sensitivities of photodiodes (e.g. CFA, color filter array). The use of primary colors is important to the present disclosure, which affects the sensitivity and resolution of the device described herein. FIG. 4 shows, a triangular shaped area (45) on a color gamut that is constructed by three tips (41), (42), and (43). The area enclosed by the triangle (45) represents the full scope of the color that the motion detection device of the present disclosure can sense. In order to achieve the largest scope to achieve the highest sensitivity to light, it is preferred that tips (41), (42), and (43) are positioned as far apart as possible as shown in FIG. 4. The image sensor is color sensitive and is shown in FIG. 2. The image sensor 26 has a generic sensitivity profile to the color light in the gamut of FIG. 4. In today's color CMOS image sensor, the photo sensitive elements, or photodiodes, are often designated to the primary color (e.g. red, green, and blue) by CFA. There are other types of sensors whose photo sensitive elements are designated to different color systems (e.g. YMCK, which stands for Yellow, Magenta, Cyan, and Key, etc.), which may also work for the present disclosure. The sensors may not necessarily be a pixel array, and in an extreme case only have a few photodiodes too satisfy the design need. When a color light is reflected from the object, or pointer, and subsequently impinges onto the image sensor 26, the light energy density is immediately decoded into the gray levels of the respective primary colors. Choosing a set of light sources (i.e. (41), (42), (43)) with the same primary colors as the image sensor 26 uses greatly enhances the sensitivity of the motion detection of the pointing device of the present disclosure and suppress the background noise (i.e. color interference from different light sources). This can be explained by FIG. 3(C) and EQ (1) through (4).

As FIG. 3 (C) shows, the three intensity peaks 407, 408, and 409 represent the sensitivity of the photodiodes to the three primary colors. If the spectrum of the light sources, FIG. 3A, is replaced with one that is similar to that of FIG. 3C, then the device of the present disclosure will achieve the highest sensitivity to the motion of pointing device, and any error of calculation is minimized. On the other hand, if a light source is white color, which is shown in FIG. 3A, the resultant spectrum will suffer from a "color smearing" effect, leading to lower sensitivity and resolution for motion detection.

The above method of assigning the color of the light sources (i.e. matching the prime color sensitivity of the image sensor by using primary colors) can be explained by the mathematical equations (1) through (4). Per color Metamerism, three primary colors can constitute an area in a full color gamut (shown in FIG. 4). In the present disclosure, the power densities received by the image detector for each color causes as little interference to each other as possible; therefore, it is important for the light sources to have an intensity distribution as depicted in FIG. 3C. The profile of each light source should be noted, wherein there is little overlap in the energy density among the light sources. This arrangement of light energy ensures that the color seen by the image sensor is discrete. Mathematically, it means EQ 1, 2, and 3 are independent because they are summed over different range of wavelength. In essence, to enhance the sensitivity and resolution, there are two principal methods. The first method deals with the factor S. The second method is applied to the sensitivity of the photodiodes, i.e. the factors $\bar{x}_\lambda$, $\bar{y}_\lambda$, and $\bar{z}_\lambda$). For example, a device engineer may chose a color system for the light sources that is most suitable for a pointing device (so that the multiplied product of S and R gets as high a value as possible), and use a CMOS image sensor that is specifically designed to capture the peak energy density of the reflected light. The best result will be gained by choosing a set of color filter arrays (CFA) within the image detector that has the same primary colors as produced by the three light sources and has the same light intensity distribution as shown in FIG. 3C.

The aforementioned methods and techniques of the present disclosure provide a simple yet powerful method to form an optically activated motion detection device and method using a plurality of color light sources and an image sensor that are matched based on the physics of color metamerism, wherein the peak intensity of the wavelength of the light sources is matched to the wavelength of the elements of the color filter array (CFA) of the image detector and wherein the respective profiles of the wave length of the light sources and the CFA elements are as un-overlapped as possible.

It should be noted that the term Lambertian used by the present disclosure is a generic usage. It can denote any material or any means that allows for a strong scattering effect of light, e.g. multiple scattering paths caused by surface roughness. Based on this principle, a Lambertian plate suitable for the present disclosure can be any material that scatters light in multiple directions. The materials that fit this requirement are, for example, a sand blasted glass, a semitransparent plate that has a large amount of light scattering particles or bubbles inside, a glass slide being coated with a stack of layers so as to allow multiple scattering paths to take place, or just a transparent plate that is coated with a layer of grease. Mathematically, the multiple scattering paths can be modeled by radiative transfer equations (RTE). An image formed by the radiative transferring effect (RTE) can be characterized by FIG. 1B.

Figure 6A:
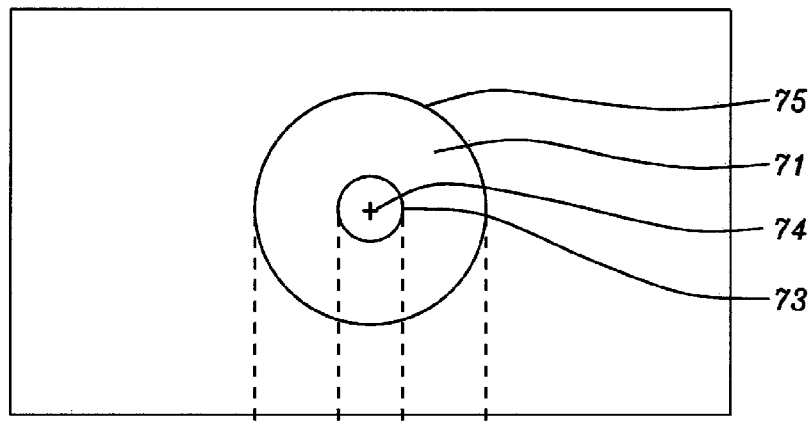
FIG. 6A is a diagram of the present disclosure showing the basic structure of a blurred image.

In FIG. 6A is shown the basic structure of a typical blurred image in which a central zone 73 that is surrounded by a halo zone 71 that has a changeable contour when the object moves on the Lambertian plate. As FIG. 1B shows, an area that is engaged in a finger touching event with the Lambertian plate 11 will reflect light in multiple directions, and a blurred image 18 (FIG. 1C) henceforth is formed on the image sensor 16. FIG. 6A shows the structure of the blurred image 18 where the blurred image 18 is largely composed of two segments, the central zone 73 and the halo zone 71. When the touching device moves, the central zone 73, and the halo zone 71 move together accordingly. From an optical point of view, the central zone 73 is more anisotropic where more light is reflected back to the image sensor than the halo zone 71. Some of light beam is scattered into the ambient and in terms of the directionality of reflected light beams where the halo zone is more isotropic. When the touching device has a sharp tip there lies a high brightness spot 74 in the central zone 73. The central zone 73 offers a unique advantage to the present disclosure where the intensity of light in this zone, which corresponds to the color index of the respective spot as seen by the image sensor 16, is so high that it will not be affected easily by the halo or other background noise.

Figure 6B:
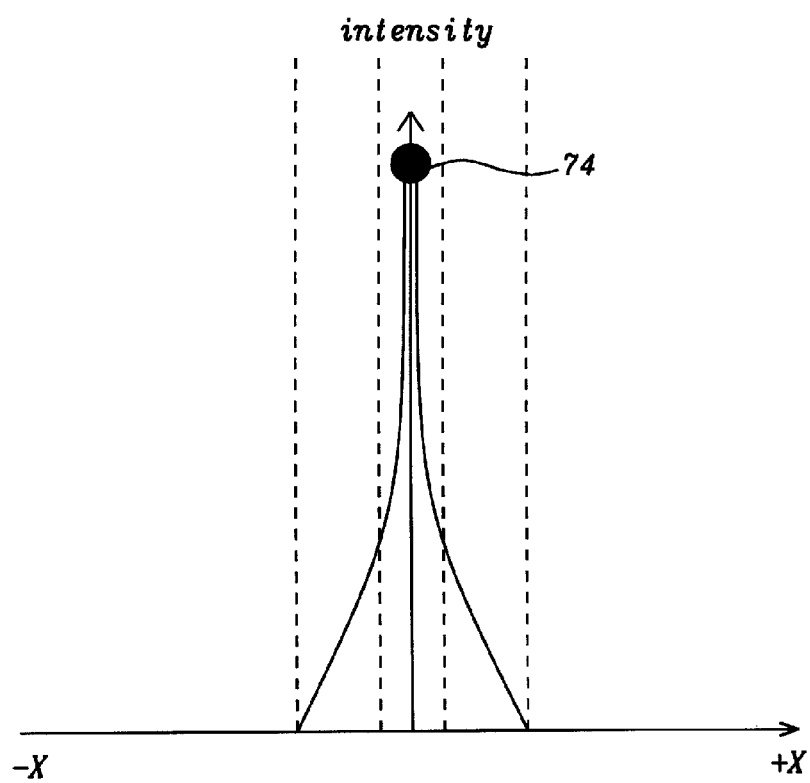
FIG. 6B is a diagram of the present disclosure demonstrating the augmented intensity of light that arrives at an image sensor due to a touching event with a sharp tip touching device.

FIG. 6B depicts the intensity of light arriving at the image sensor in which the central zone 73 has higher intensity of light than that of the halo zone 71 in the image frame, and the intensity gradually decreases toward the edges of the halo zone 71 Thus, as FIG. 6B shows, the SNR (signal to noise ratio) of the central zone 73 is very high. While the contour of halo zone 75 is subjected to be changed throughout the moving actions of the pointing device, e.g. finger(s), a high fidelity result that is the identification of the location of the high brightness spot can always be assured by the present disclosure. As FIG. 6B further shows, the intensity of the central zone as seen by the image sensor is not necessarily a uniformly distributed intensity. The contour of the pointing device plays a minor role in detecting the central zone. To an image sensor that only sees a blurred image, it may not be easy for the image sensor to characterize the contour of the central zone. When using a sharp tip pointing device, the location of centroid 74 can be identified by the following means. Note that the centroid 74 usually is the point where the intensity of light is the highest comparing to that of the rest points in the central zone 73. Such a unique characteristic readily enhances the SNR value. By analyzing the color index of the respective centroid, the present disclosed device can track the movement of the pointing device, stylus, or fingertip, with high accuracy and reliability. The presently disclosed method and the associated device serve as a robust means for many applications that require high sensitivity and high resolution, e.g. video game and mechanical drawing programs such as AUTOCAD.

The user, such as a device engineer, should be especially interested that each point on the Lambertian plate will reflect a unique set of color indices representing a special combination of the intensity of the respective color light sources. To meet this goal, there are more ways than illuminating the Lambertian plate with multiple light colored lights. For example, the above stated effect can be realized by using a Lambertian plate that is tinted by pigment in several colors as well. While the finger moves over the Lambertian plate, the changes of color is caused by the variation of pigment concentration in the semi transparent plate (In this case the number of light sources can be reduced to one). Thus, the presently disclosed device has the capability of rendering the exact location data in place of the motion vectors or relative positional data to a host computer, and without doing pattern recognition (or a minimal amount of for result confirmation use), the presently disclosed device is able to provide the location data for a cursor on the displaying device instantly. This advantage not only buttresses the fundamental design of high speed motion detection devices, but also reduces the power consumption dramatically since no target tracing task is needed. The other important advantage of the presently disclosed device and method is that the pointing device(s) on the displaying device can "hop" rather than maneuver. For a large displaying device, e.g. a home TV panel, which is expected to be popular in the near future, such a feature offers a convenience of allowing for the household users to move the cursor(s) from one location to another without crawling through the path in the middle. Lastly, the presently disclosed methods and device supports multiple touching effect. When there are multiple pointing devices touching the Lambertian plate, the color index of each of the respective points of contacts are different from one another, and the image sensor can easily discern them without confusion.

While the disclosure has been particularly shown and described with reference to preferred embodiments thereof, it will be understood by those skilled in the art that various changes in form and details may be made without departing from the spirit and scope of the disclosure.

What is claimed is:

1. A motion detection device, comprising:
    a) a plurality of lights to illuminate a moveable element, wherein each of the lights produce a different wavelength of light;
    b) a light sensing device capable of detecting a hue of a reflection of light from said moveable element illuminated by said plurality of lights; and
    c) wherein said motion detection device is capable of evaluating said hue to determine location or movement of the moveable element.

2. The motion detection device of claim 1, wherein said moveable element is a pointing device used for a cursor maneuvering, object navigating, touch sensing, or program activation and deactivation.

3. The motion detection device of claim 1, further comprising:
    a) a capture of a first signal of said moveable element followed by a capture of a second signal of said moveable element; and
    b) a comparison of the hue between the first and second signals to determine motion and location of the moveable element.

4. The motion detection device of claim 3, wherein the image sensing device is a color image sensor, or a set of photodiodes.

5. The motion detection device of claim 1, wherein said each of the plurality of colored lights emits a light in a different primary color.

6. The motion detection device of claim 1, wherein at least one of the colored light emits a light not in the primary color.

7. A method of detecting motion, comprising:
- a) illuminating a moveable device with a plurality of light sources, wherein each of the light sources emits light in a wavelength different from one another;
- b) detecting a hue of light reflected from said moveable device; and
- c) determining motion and location of the moveable device from said hue to produce control or selection capability.

8. The method of claim 7, wherein said plurality of light sources is three.

9. The method of claim 7, wherein the wavelength of said plurality of light sources falls within the regime of red, green, and blue colors.

10. The method of claim 7, wherein the color of the plurality of light sources are primary colors.

11. The method of claim 7, wherein said moveable device is a finger or a stylus.

12. The method of claim 7, wherein said hue of light reflected from the moveable device is dependent upon a relative location of the moveable device among the light sources.

13. The method of claim 7, wherein illuminating said moveable device with said light source that produces a high brightness spot in an image sensor, whereby a first and a second image capture determines a motion vector from a movement of the high brightness spot.

14. The method of claim 7, wherein determining motion and location of the moveable device, further comprises, an illuminated environment with background noise, wherein at least one light source has a known wavelength in a medium that has a strong radiative transferring effect and an image sensor.

* * * * *